United States Patent
Kishino et al.

[15] 3,689,603
[45] Sept. 5, 1972

[54] O-ALKYL-O-PHENYL-S-ALKOXYETHYL-PHOSPHORO-THIOLATES

[72] Inventors: Shigeo Kishino, Tokyo; Kozo Shiokawa; Akio Kudamatsu, both of Kanagawa-ken; Yasuo Yamada, Tokyo, all of Japan

[73] Assignee: Farbenfabriken Bayer Aktiengesellschaft, Leverkusen, Germany

[22] Filed: July 23, 1970

[21] Appl. No.: 57,793

[30] Foreign Application Priority Data

July 26, 1969 Japan ....................44/58738

[52] U.S. Cl. ..................260/950, 260/949, 260/963, 260/973, 260/978, 424/217
[51] Int. Cl. ..............................C07f 9/12, A01n 9/36
[58] Field of Search.......................260/950

[56] References Cited
FOREIGN PATENTS OR APPLICATIONS 624,475   9/1961   Italy......................260/950 X

*Primary Examiner*—Joseph Rebold
*Assistant Examiner*—Anton H. Sutto
*Attorney*—Burgess, Dinklage & Sprung

[57] ABSTRACT

O-alkyl-O-phenyl-S-alkoxyethyl-phosphorothiolates of the general formula

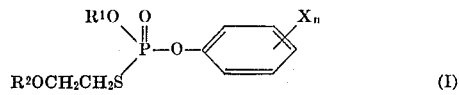

in which
R$^1$ and R$^2$, which may be the same or different, denote alkyl radicals of one to four carbon atoms, each X independently denotes a halogen atom, and $n$ is 0, 1, 2 or 3,
which possess insecticidal, fungicidal and nematocidal properties.

38 Claims, No Drawings

O-ALKYL-O-PHENYL-S-ALKOXYETHYL-PHOSPHORO-THIOLATES

The present invention relates to certain new thiophosphoric acid esters, to a process for their production and to their use as insecticides and fungicides.

The present invention provides thiophosphoric acid esters of the general formula:

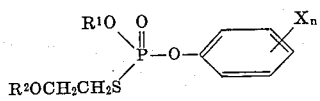 (I)

in which
R¹ and R², which may be the same or different, denote alkyl radicals of one to four carbon atoms,
each X denotes a halogen atom, and
n is 0,1,2,3,4 or 5.

It has been found that the organic thiophosphoric acid esters of the said general formula (I) possess insecticidal and fungicidal properties.

The phosphoric acid esters of the present invention possess an excellent insecticidal activity and they can be used to control a wide range of insect pests such as noxious sucking and biting insects and insect pests which are parasitic on plants. The esters of the invention can be effectively applied as insecticides against pests of rice, fruit trees and vegetables, including pests of the orders Coleoptera, Lepidoptera and Diptera; the esters may also be used against plant parasitic nematodes and soil nematodes.

Furthermore, the thiophosphoric acid esters of the invention possess excellent fungicidal activity as well as reproduction-inhibiting activity in respect of plant pathogenic fungi; therefore, they can be applied for the control of various kinds of plant pathogenic fungi. The esters can be effectively used as fungicides in cases of diseases caused by Archimycetes, Phycomycetes, Ascomycetes, Basidiomycetes and Fungi imperfecti. A remarkably good effect is obtained when the esters are used against plant pathogenic fungi or rice, fruit trees and vegetables.

Compounds of the formula (I) in which the phenyl ring carries a chlorine or bromine atom at each of the 2, 4, and 5 positions possess characteristic fungicidal activity.

As mentioned above, the compounds according to the present invention have broad and excellent biological activity as they show both insecticidal and fungicidal properties and, therefore, they are of great practical value. Moreover, these compounds do not contain heavy metals as organic mercury compounds do; as a result, it is unnecessary to worry about residual toxicity in crops. The compounds of the invention also have low toxicity; they do not show such acute toxicity as, for example, Parathion. These features of the esters of formula (I) provide a great advantage in the handling of the agricultural formulations thereof.

The present invention also provides a process for the production of the esters of formula (I) in which (a) an O,S-diester of a thiophosphoric acid halide of the formula

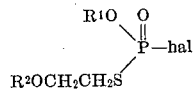 (II)

is reacted with a phenol or phenolate of the formula

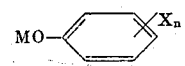 (III)

or (b) a thiophosphoric acid O,O-diester, or a salt thereof, of the formula

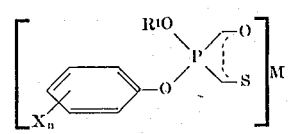 (IV)

is reacted with a 1-halo-2-alkoxy ethane of the formula $$Hal-CH_2-CH_2-OR^2 \quad (V)$$

in which
R¹, R², X and n have the meanings given above,
M is a hydrogen atom, a metal equivalent or an ammonium radical, and
Hal is a halogen atom.

R¹ and R² are alkyl radicals of one to four carbon atoms, namely methyl, ethyl, n- or iso-propyl, n-, iso-, sec- or tert-butyl radicals, preferably methyl, ethyl, n- or iso-propyl, n-, iso- or sec-butyl radicals. Each X is a halogen atom such as a chlorine, bromine, fluorine or iodine atom, preferably a chlorine or bromine atom. n is 0 or an integer of 1 to 5, preferably 1, 2 or 3. M is a hydrogen atom, an ammonium radical, a metal equivalent, especially an alkali metal atom such as a sodium, potassium or lithium atom; M is preferably a hydrogen, sodium or potassium atom, or an ammonium radical. Hal is a halogen atom such as a chlorine, bromine, fluorine or iodine atom, preferably a chlorine atom.

The process can be carried out by reacting the starting materials directly, but it can be also carried out by using an inert solvent or diluent. The reactants are conveniently used in equimolar amounts.

Suitable solvents and diluents include aliphatic or aromatic hydrocarbons (which may be halogenated), for example, benzine, methylene dichloride, chloroform, carbon tetrachloride, benzene, chlorobenzene, toluene and xylene; ethers, for example, diethylether, dibutylether, dioxane and tetrahydrofuran and aliphatic alcohols or ketones with low boiling points, for example, methanol, ethanol, isopropanol, acetone, methylethylketone, methylisopropylketone and methylisobutylketone. Lower aliphatic nitriles such as acetonitrile and propionitrile are also usable.

The reaction may be carried out in the presence of an acid-binding agent; this is especially advantageous when M is a hydrogen atom. For this purpose, there may be used alkali metal carbonates, bicarbonates and alcoholates, such as sodium hydrogen carbonate, potassium carbonate, sodium carbonate and potassium or sodium methylate or ethylate, and tertiary aliphatic, aromatic and heterocyclic amines, such as triethylamine, diethylaniline and pyridine.

The process variant (a) may be carried out within a fairly wide temperature range, generally from 0° to 110° C, preferably from 10° to 80° C.

The starting material of the formula (II) may be prepared according to generally known methods, for example, by reacting an S-(2-alkoxy)ethyldihalide phosphorothiolate with an alcohol or a metal alcoholate in an inert solvent or diluent. This reaction may be carried out in the presence of an acid-binding agent as occasion demands, for example, when an alcohol is employed as a reactant.

The process variant (b) can be carried out within a fairly wide temperature range; generally, the reaction is effected at from 0° to 100° C, preferably from 30° to 80° C.

The starting material of the formula (IV) may be prepared according to generally known methods. For example, an O-alkyl-O-substituted-phenylthionophosphoryl chloride may be reacted with an alkali hydroxide. The resulting O-alkyl-O-substituted-phenylthio-phosphoric acid salt may be used after separation or it may be used in situ without separation, by reacting it with a 1-halo-2-alkoxyethane to obtain the desired product of the general formula (I)

The following Example illustrates the process for preparing compounds of the present invention.

EXAMPLE 1

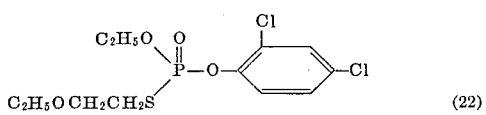

(22)

32.5 g of the potassium salt of O-ethyl O-(2,4-dichlorophenyl)thiophosphoric acid are dissolved in 70 ml of alcohol and 16 g of 2-ethoxyethylbromide are added to the solution. The mixture is stirred at 60°–70° C for 3 hours. The resulting inorganic salt is filtered off. After distilling off the alcohol, the residue is dissolved in benzene. The benzene solution is washed with a 1 percent sodium carbonate solution and then with water, and is then dried over anhydrous sodium sulphate. After distilling off the benzene, the residue is distilled under reduced pressure and 21 g of O-ethyl O-(2,4-dichlophenyl) S-(2-ethoxy-ethyl)phosphorothiolate are obtained; b.p. 161°–170° C/0.2 mmHg, $n_D^{20}$ = 1.5331. This compound is designated hereinafter by the number 22. The preparation of the potassium salt of O-ethyl O-(2,4-dichlorophenyl)-thiophosphoric acid may be carried out as follows:

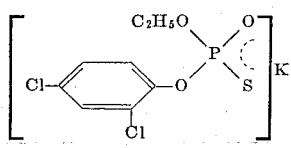

34 g of potassium hydroxide are dissolved in 200 ml of water and 200 ml of dioxane are added to the solution. While stirring the solution vigorously, 92 g of O-ethyl O-(2,4-dichloro-phenyl)thionophosphorylchloride are added dropwise at 30°–40° C. After the addition, the reaction temperature is raised gradually, and the stirring is continued at 60°–70° C for 1 hour to complete the reaction. Then the dioxane and water are distilled off under reduced pressure. The residue is dissolved in acetone and the inorganic salt is filtered off. After distilling off the acetone and adding toluene and n-hexane to the residue and filtering off the precipitate, 75 g of crude crystals of the potassium salt of OO-ethyl O-(2,4-dichlorophenyl)thiophosphoric acid are obtained.

Representative compounds which may be prepared by methods similar to the method stated above are shown in the following Table.

TABLE 1

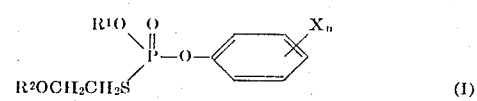

(I)

| Compound No. | $R^1$ | $R^2$ | $X_n$ | Boiling Point (°C/mmHg) | Refraction coefficient ($n_D^{20}$) |
|---|---|---|---|---|---|
| 1 | $CH_3$ | $C_2H_5$ | n = 0 | | |
| 2 | $C_2H_5$ | $CH_3$ | n = 0 | | |
| 3 | $C_2H_5$ | $C_2H_5$ | n = 0 | 140–144/0.2 | 1.5141 |
| 4 | $C_2H_5$ | n-$C_3H_7$ | n = 0 | 137–142/0.05 | 1.5085 |
| 5 | $C_2H_5$ | i-$C_3H_7$ | n = 0 | 150–154/0.1 | 1.5069 |
| 6 | $C_2H_5$ | n-$C_4H_9$ | n = 0 | 145–150/0.05 | 1.5058 |
| 7 | i-$C_3H_7$ | $C_2H_5$ | n = 0 | 140–150/0.08 | 1.5068 |
| 8 | $C_2H_5$ | $CH_3$ | 2-Cl | | |
| 9 | $C_2H_5$ | n-$C_3H_7$ | 2-Cl | 140–144/0.07 | 1.5202 |
| 10 | $C_2H_5$ | i-$C_3H_7$ | 2-Cl | | |
| 11 | $C_2H_5$ | $C_2H_5$ | 2-Cl | 139–143/0.15 | 1.5245 |
| 12 | $C_2H_5$ | $C_2H_5$ | 2-Br | | |
| 13 | $CH_3$ | $C_2H_5$ | 4-Cl | | 1.5414 |
| 14 | $C_2H_5$ | $CH_3$ | 4-Cl | 151–156/0.13 | 1.5270 |
| 15 | $C_2H_5$ | $C_2H_5$ | 4-Cl | 140–145/0.1 | 1.5229 |
| 16 | $C_2H_5$ | n-$C_3H_7$ | 4-Cl | 145–150/0.1 | 1.5179 |
| 17 | $C_2H_5$ | i-$C_3H_7$ | 4-Cl | | |
| 18 | $C_2H_5$ | n-$C_4H_9$ | 4-Cl | | |
| 19 | $C_2H_5$ | $C_2H_5$ | 4-Br | | |
| 20 | $CH_3$ | $C_2H_5$ | 2,4-$Cl_2$ | | 1.5575 |
| 21 | $C_2H_5$ | $CH_3$ | 2,4-$Cl_2$ | 145–153/0.1 | 1.5390 |
| 22 | $C_2H_5$ | $C_2H_5$ | 2,4-$Cl_2$ | 161–170/0.2 | 1.5331 |
| 23 | $C_2H_5$ | n-$C_3H_7$ | 2,4-$Cl_2$ | 145–150/0.08 | 1.5291 |
| 24 | $C_2H_5$ | i-$C_3H_7$ | 2,4-$Cl_2$ | 160–166/0.3 | 1.5275 |
| 25 | $C_2H_5$ | n-$C_4H_9$ | 2,4-$Cl_2$ | 160–168/0.3 | 1.5248 |
| 26 | i-$C_3H_7$ | $C_2H_5$ | 2,4-$Cl_2$ | 160–162/0.2 | 1.5240 |
| 27 | n-$C_3H_7$ | $C_2H_5$ | 2,4-$Cl_2$ | | |
| 28 | n-$C_4H_9$ | $C_2H_5$ | 2,4-$Cl_2$ | | |
| 29 | $C_2H_5$ | $C_2H_5$ | 2,5-$Cl_2$ | | |
| 30 | $C_2H_5$ | $C_2H_5$ | 2,4-$Br_2$ | | |
| 31 | $C_2H_5$ | $CH_3$ | 2,4,5-$Cl_3$ | | |
| 32 | $C_2H_5$ | $C_2H_5$ | 2,4,5-$Cl_3$ | 150–155/0.15 | 1.5461 |
| 33 | $C_2H_5$ | i-$C_3H_7$ | 2,4,5,-$Cl_3$ | | |
| 34 | n-$C_4H_9$ | $C_2H_5$ | 2,4,5-$Cl_3$ | | |
| 35 | $C_2H_5$ | $C_3H_5$ | 2,4,6-$Cl_3$ | | |
| 36 | $C_2H_5$ | $C_2H_5$ | 2,5-$Cl_2$, 4-Br | | |

When the compounds according to this invention are in insecticidal fungicidal compositions, they may be applied after dilution with water, using solvents or adjuvants as occasion demands, or they may be formulated into various types of formulations by mixing them with various kinds of inert gases, liquid or solid diluents and/or carriers and, as occasion demands, using adjuvants such as surface-active agents, emulsifying agents, dispersing agents, developers and adhesive agents according to the methods generally practised in the manufacture of agricultural compositions.

As gaseous diluents or carriers, freon or other propellant gases in normal condition for aerosol use, are employed.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as aromatic naphthas, toluene, xylenes, dimethylnaphthalenes or benzene, chlorinated aromatic and aliphatic hydrocarbons, such as chlorobenzenes, carbon tetrachloride, methylene dichloride, and chloroethylene, paraffins, such as mineral oil fractions, cyclohexane, alcohols, such as methanol, ethanol, propanol or butanol, or strongly polar solvents, such as dimethyl formamide or dimethyl sulphoxide, as well as water.

As solid diluents or carriers, there are preferably used ground natural minerals, such as bentonite, atapulgite, kaolins, montmorillonite, clays, talc, diatomaceous earth, or chalk, or ground synthetic minerals, such as highly-dispersed silicic acid or silicates and alumina.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

As occasion demands, other agricultural chemicals, such as insecticides, nematocides, fungicides (including antibiotics), herbicides, plant-growth regulators, or fertilizers can be present.

Insecticidal and fungicidal compositions according to the present invention generally contain 0.1 - 95 percent, preferably 0.5 - 90 percent by weight of the active compound. The amount of the active compound or compounds contained in the compositions can be varied according to the types of formulation, methods of application, and the purpose, time and place of application as well as the conditions of outbreak of diseases.

Active compounds according to the present invention can be used as they are, or by formulating them into all types of ready-to-use formulations employed in the art, such as liquids, emulsions, emulsifiable concentrates, wettable powders, soluble powders, oil aerosols, pastes, fumigants, dust, granules, pellets, and tablets.

Application of these compositions is carried out by, for example, mixing, watering, spraying, atomizing, misting, dusting, scattering, fumigating, drenching, dressing the insect pests and/or fungi and/or their habitat through direct application or by using any suitable apparatus. The active compounds according to the present invention can also be used in accordance with the well-known ultra-low-volume (ULV) process. According to this method, the preparation may contain up to 95 percent by weight of active compound or even the active compound alone.

The amount of active compound in the ready-to-use preparation can be varied within a fairly wide range. Generally, the preparation contain 0.005 — 10 percent, preferably 0.01 — 5.0 percent, by weight of the active compound.

The quantity of active compound applied to an area of agriculture is generally between from 0.15 — 10 kg per hectare, preferably from 0.4 13 6 kg per hectare. However, in special cases, it is possible to increase or reduce the amount and actually it is sometimes necessary.

The present invention provides an insecticidal and fungicidal composition containing as active ingredient an ester of the present invention in admixture with a diluent or carrier. When a liquid diluent is used, it preferably contains a surface-active agent.

The present invention also provides a method of combating insects and fungi which comprises applying to the insects or fungi, or to an insect or fungus habitat, an ester of the present invention alone or in the form of a composition containing as active ingredient as ester of the present invention in admixture with a diluent or carrier.

The present invention further provides a method of providing a harvested crop which comprises applying an ester of the invention to the area of cultivation of the crop whereby the latter is protected from damage by insects or fungi, and harvesting the crop.

The present invention also provides crops protected from damage by insects or fungi by being grown in areas in which immediately prior to and/or during the time of the growing an ester of the present invention was applied alone or in admixture with a diluent or carrier.

The compositions of the invention are illustrated in and by the following Examples.

EXAMPLE (I)

15 parts of Compound No. 11 as identified in Table 1, 80 parts of a mixture of diatomaceous earth and kaolin and 5 parts of an emulsifier, Runnox (trade name of a product of Toho Kagaku Kogyo K.K.), are mixed and crushed to produce a wettable powder. It is used after dilution with water.

EXAMPLE (II)

30 parts of Compound No. 22, 30 parts of xylene, 30 parts of Kawakasol (trade name of a product of Kawasaki Kasei Kogyo K.K.) and 10 parts of an emulsifier, Sorpol (trade name of the product of Toho Kagaku Kogyo K.K.), are mixed and stirred to formulate an emulsifiable concentrate. It is used after dilution with water.

EXAMPLE (III)

To a mixture consisting of 10 parts of Compound No. 32, 10 parts of bentonite, 78 parts of zeeklite and 2 parts of lignin sulphate, 25 parts of water are added and the mixture is firmly kneaded. It is cut into granules of 20—40 mesh by a push-out type mulmerizer. The granules are then dried at 40°—50° C to provide a granular formulation.

EXAMPLE (IV)

2 parts of Compound No. 3 and 98 parts of a mixture of talc and clay are mixed and crushed, and used as a dust formulation.

The compounds according to the present invention are characterized by substantially improved efficacy and extremely low toxicity to warm-blooded animals compared with the known compounds with similar structure and mode of action disclosed in the literature. Therefore, they are of great practical value. The effectiveness of the present compounds is illustrated in the following Examples, in which compounds are identified by the numbers given in Example 1.

Example A Test against tobacco cutworm larvae

Test procedure:

Leaves of sweet potato were dipped in dilute aqueous solutions of a compound of the present invention of the prescribed concentrations and dried. They were placed in Petri dishes of 9 cm diameter.

10 tobacco cutworm larvae (*Prodenia litura*) of 3 instar were put into each of the Petri dishes thus prepared. The dishes were placed in an incubator kept at 28° C.

24 hours later, the number of dead insects were counted and the mortality was calculated.

The results are shown in the Table 2.

TABLE 2

Results of test against tobacco cutworm larvae

| Active Compound | Mortality (in percent) at the concentration of | | |
|---|---|---|---|
| | 1,000 ppm | 300 ppm | 100 ppm |
| No. | | | |
| 1 | 100 | 80 | |
| 2 | 100 | 80 | 20 |
| 2 | 100 | 100 | 70 |
| 4 | 100 | 100 | 30 |
| 5 | 100 | 100 | 80 |
| 6 | 100 | 80 | 30 |
| 7 | 100 | 50 | |
| 8 | 100 | 100 | 90 |
| 9 | 100 | 90 | 30 |
| 10 | 100 | 70 | 10 |
| 11 | 100 | 100 | 90 |
| 12 | 100 | 100 | 90 |
| 13 | 100 | 50 | |
| 14 | 100 | 100 | 75 |
| 15 | 100 | 100 | 100 |
| 16 | 100 | 100 | 80 |
| 17 | 100 | 100 | 60 |
| 18 | 100 | 100 | 90 |
| 19 | 100 | 100 | 100 |
| 20 | 100 | 60 | |
| 21 | 100 | 100 | 100 |
| 22 | 100 | 100 | 100 |
| 23 | 100 | 100 | 50 |
| 24 | 100 | 100 | 80 |
| 25 | 100 | 100 | 50 |
| 26 | 100 | 50 | 10 |
| 27 | 100 | 90 | 40 |
| 28 | 100 | 80 | 30 |
| 29 | 100 | 100 | 100 |
| 30 | 100 | 100 | 60 |
| 31 | 100 | 100 | 90 |
| 32 | 100 | 100 | 100 |
| 33 | 100 | 100 | 50 |
| 34 | 100 | 60 | |
| 35 | 100 | 100 | 90 |
| 36 | 100 | 100 | 100 |
| Dipterex (Comparison) | 100 | 25 | 0 |
| Lebaycid (Comparison) | 30 | 0 | 0 |

Notes: 1) Dipterex: dimethyl-2,2,2-trichloro-1-hydroxyethyl phosphonate.
2) Lebaycid: dimethyl-4-(methylthio)-3-methylphenyl thiophosphate.

EXAMPLE B

Test against Fall webworms

Test Procedure:

Leaves of mulberry were dipped in dilute aqueous solutions of a compound of the present invention of the prescribed concentrations and dried. They were placed in Petri dishes of 9 cm diameter.

10 Fall webworms larvae (*Hyphantria cunea*) of 4 instar were placed in each of the dishes thus prepared. The dishes were placed in an incubator kept at 25° C.

24 hours later, the number of dead insects was counted and the mortality was calculated.

The results are shown in the Table 3.

TABLE 3

Results of test against Fall webworms

| Active Compound | Mortality (in percent) at the concentrations of | | |
|---|---|---|---|
| | 1,000 ppm | 300 ppm | 100 ppm |
| No. | | | |
| 3 | 100 | 100 | 80 |
| 5 | 100 | 100 | 20 |
| 8 | 100 | 100 | 60 |
| 11 | 100 | 100 | 100 |
| 12 | 100 | 100 | 100 |
| 13 | 100 | 90 | |
| 14 | 100 | 100 | 40 |
| 15 | 100 | 100 | 50 |
| 20 | 100 | 40 | |
| 21 | 100 | 100 | 60 |
| 22 | 100 | 100 | 100 |
| 23 | 100 | 100 | 100 |
| 24 | 100 | 100 | 100 |
| 25 | 100 | 80 | |
| 29 | 100 | 100 | 80 |
| 30 | 100 | 100 | 100 |
| 32 | 100 | 100 | 100 |
| 35 | 100 | 100 | 50 |
| 36 | 100 | 100 | 100 |
| Dipterex (Comparison) | 100 | 100 | 20 |
| Lebaycid (Comparison) | 90 | 0 | 0 |

EXAMPLE C

Test against rice stem borer larvae

Test procedure:

To paddy rice plants at the tillering stage, which were planted in pots of 12 cm diameter, egg masses of the rice stem borer (*Chilo supperssalis*) were attached.

7 days after the eggs had hatched, a dilute aqueous solution of a compound of the present invention prepared from an emulsifiable concentrate was sprayed in an amount of 40 ml per pot using a spray-gun.

The pots were left in a green-house. Three days after the treatment, the numbers of surviving and killed insects in the rice stalks were counted and mortality was calculated.

The results are shown in Table 4.

TABLE 4

Results of test against rice stem borer larvae

| Active Compound | Concentration of active ingredient (ppm) | Mortality (in percent) |
|---|---|---|
| No. | | |
| 3 | 250 | 100 |

| | | |
|---|---|---|
| 5 | 250 | 100 |
| 8 | 250 | 100 |
| 11 | 250 | 100 |
| 12 | 250 | 100 |
| 15 | 250 | 100 |
| 19 | 250 | 100 |
| 21 | 250 | 97.4 |
| 22 | 250 | 100 |
| 24 | 250 | 100 |
| 29 | 250 | 100 |
| 32 | 250 | 100 |
| 36 | 250 | 100 |
| Dipterex (Comparison) | 250 | 95 |
| Lebaycid (Comparison) | 250 | 100 |

EXAMPLE D

Test against adult house flies

Test procedure:

1 ml of a dilute solution of a compound of the present invention of the prescribed concentration was applied to a filter paper placed in a Petri dish of 9 cm diameter.

10 mature female house flies (*Musca domestica*) were put in each of several such Petri dishes and left in an incubator kept at 28° C.

24 hours later, the number of dead insects was counted, and the mortality was calculated.

The results are shown in Table 5.

TABLE 5

Results of test against adult house flies

| Active Compound No. | Mortality (in percent) at the 1,000 ppm | concentration of 100 ppm |
|---|---|---|
| 3 | 100 | 100 |
| 5 | 100 | 90 |
| 6 | 100 | 80 |
| 8 | 100 | 90 |
| 10 | 100 | 100 |
| 11 | 100 | 100 |
| 12 | 100 | 100 |
| 13 | 100 | 100 |
| 14 | 100 | 90 |
| 15 | 100 | 100 |
| 16 | 100 | 100 |
| 19 | 100 | 100 |
| 20 | 100 | 100 |
| 21 | 100 | 100 |
| 22 | 100 | 100 |
| 23 | 100 | 100 |
| 24 | 100 | 100 |
| 25 | 100 | 100 |
| 29 | 100 | 100 |
| 30 | 100 | 100 |
| 32 | 100 | 100 |
| 35 | 100 | 100 |
| 36 | 100 | 100 |
| Dipterex (Comparison | 100 | 100 |

Example E Test against the German Cockroach (Blattella germanica)

The test was carried out using the same procedure as in Example D.

The results are shown in Table 6.

TABLE 6

Results of test against German cockroach

| Active Compound No. | Mortality (in percent) at the 1,000 ppm | concentration of 100 ppm |
|---|---|---|
| 3 | 100 | 70 |
| 5 | 100 | 70 |
| 8 | 100 | 100 |
| 11 | 100 | 100 |
| 12 | 100 | 100 |
| 13 | 100 | 100 |
| 15 | 100 | 100 |
| 19 | 100 | 100 |
| 22 | 100 | 100 |
| 24 | 100 | 100 |
| 29 | 100 | 100 |
| 32 | 100 | 100 |

What we claim is:

1. Thiophosphoric acid esters of the general formula

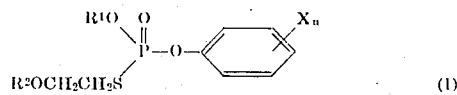

(1)

in which
R$^1$ and R$^2$, which may be the same or different, denote alkyl radicals of one to four carbon atoms,
each X independently denotes a halogen atom, and
n is 0, 1, 2, or 3.

2. Esters according to claim 1 in which R$^1$ and R$^2$ each denote a methyl, ethyl, n-propyl, isopropyl, n-butyl, iso-butyl or sec-butyl radical, each X denotes a chlorine or bromine atom and n denotes 1, 2 or 3.

3. The ester according to claim 1 of the formula

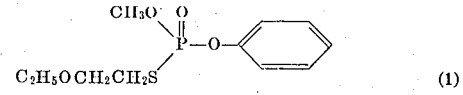

(1)

4. The ester according to claim 1 of the formula

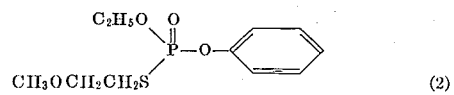

(2)

5. The ester according to claim 1 of the formula

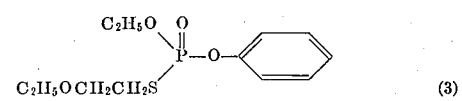

(3)

6. The ester according to claim 1 of the formula

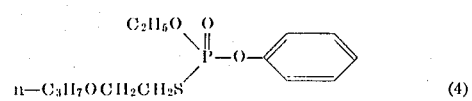

(4)

7. The ester according to claim 1 of the formula

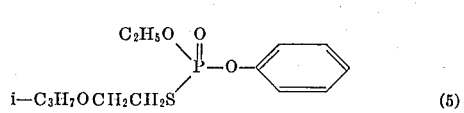

(5)

8. The ester according to claim 1 of the formula

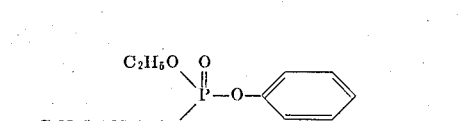

(6)

9. The ester according to claim 1 of the formula

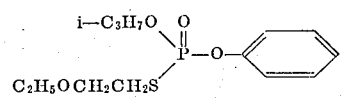 (7)

10. The ester according to claim 1 of the formula

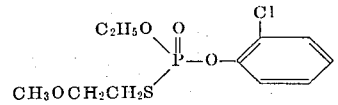 (8)

11. The ester according to claim 1 of the formula

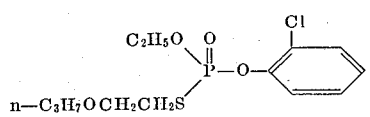 (9)

12. The ester according to claim 1 of the formula

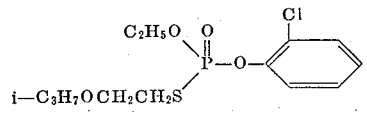 (10)

13. The ester according to claim 1 of the formula

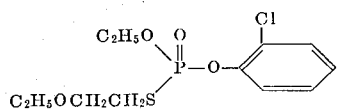 (11)

14. The ester according to claim 1 of the formula

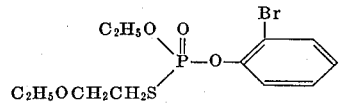 (12)

15. The ester according to claim 1 of the formula

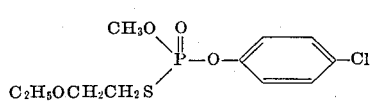 (13)

16. The ester according to claim 1 of the formula

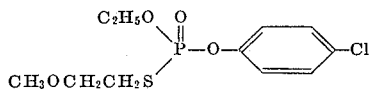 (14)

17. The ester according to claim 1 of the formula

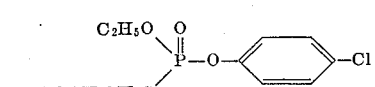 (15)

18. The ester according to claim 1 of the formula

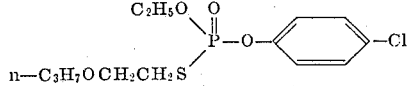 (16)

19. The ester according to claim 1 of the formula

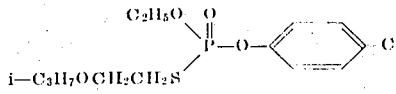 (17)

20. The ester according to claim 1 of the formula

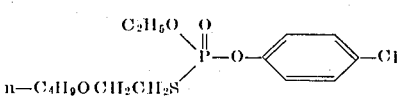 (18)

21. The ester according to claim 1 of the formula

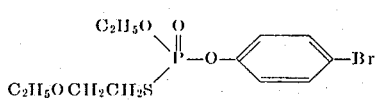 (19)

22. The ester according to claim 1 of the formula

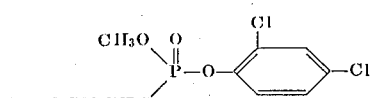 (20)

23. The ester according to claim 1 of the formula

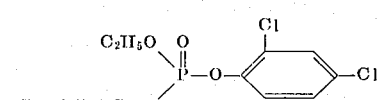 (21)

24. The ester according to claim 1 of the formula

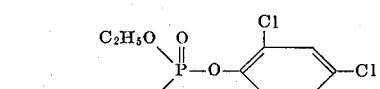 (22)

25. The ester according to claim 1 of the formula

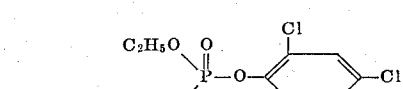 (23)

26. The ester according to claim 1 of the formula

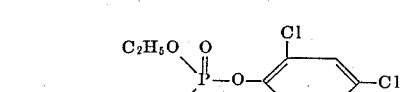 (24)

27. The ester according to claim 1 of the formula

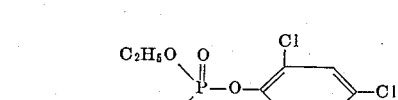 (25)

28. The ester according to claim 1 of the formula

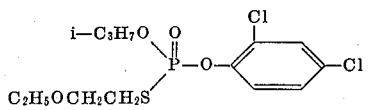

(26)

29. The ester according to claim 1 of the formula

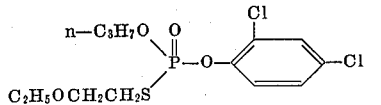

(27)

30. The ester according to claim 1 of the formula

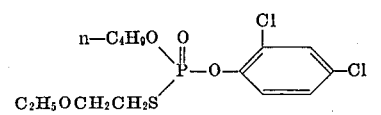

(28)

31. The ester according to claim 1 of the formula

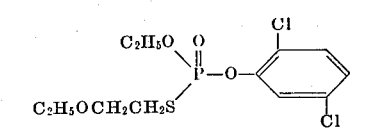

(29)

32. The ester according to claim 1 of the formula

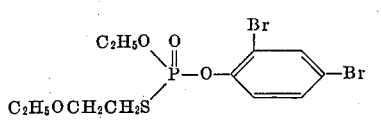

(30)

33. The ester according to claim 1 of the formula

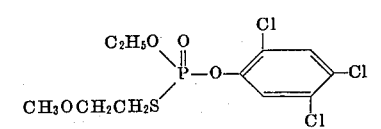

(31)

34. The ester according to claim 1 of the formula

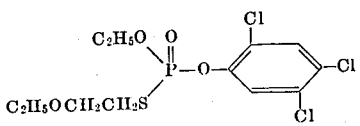

(32)

35. The ester according to claim 1 of the formula

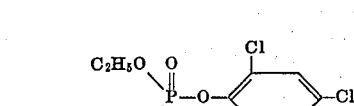

(33)

36. The ester according to claim 1 of the formula

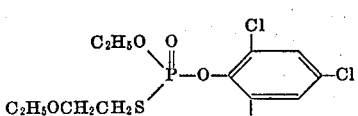

(34)

37. The ester according to claim 1 of the formula

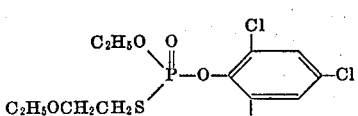

(35)

38. The ester according to claim 1 of the formula

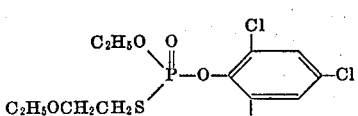

(36)

* * * * *

UNITED STATES PATENT OFFICE
CERTIFICATE OF CORRECTION

Patent No. 3,689,603  Dated September 5, 1972

Inventor(s) Shigeo Kishino et al

It is certified that error appears in the above-identified patent and that said Letters Patent are hereby corrected as shown below:

Col. 4, line 6

Change "OO-ethyl-" to -- O-ethyl --.

Col. 4, line 36  Comp. 16

Change "C_2H5" to -- $C_2H_5$ --.

Col. 4, line 55

Between "insecticidal" and "fungicidal" insert

-- and --.

Col. 6, line 9

Change "0.413 6 kg." to -- 0.4 - 6 kg. --.

Col. 14, line 12

Change "$C_2H_3O$" to -- $C_2H_5O$ --.

Signed and sealed this 6th day of March 1973.

(SEAL)
Attest:

EDWARD M. FLETCHER, JR.  ROBERT GOTTSCHALK
Attesting Officer  Commissioner of Patents